United States Patent [19]

Wilson

[11] Patent Number: 4,503,327
[45] Date of Patent: Mar. 5, 1985

[54] COMBINATION THERMAL AND RADIATION SHIELD

[75] Inventor: Billy F. Wilson, Houston, Tex.

[73] Assignee: Dresser Industries, Inc., Dallas, Tex.

[21] Appl. No.: 395,162

[22] Filed: Jul. 6, 1982

[51] Int. Cl.³ .................. G01V 5/04; G12B 15/06
[52] U.S. Cl. ................................ 250/261; 250/267
[58] Field of Search ............ 250/261, 267, 505.1; 62/260, DIG. 9, 514 R

[56] References Cited

U.S. PATENT DOCUMENTS

| 3,038,074 | 6/1962 | Scherbatskoy | 250/261 |
| 3,163,761 | 12/1964 | Garrison et al. | 250/268 |
| 3,859,523 | 1/1975 | Wilson et al. | 250/261 |
| 4,312,192 | 1/1982 | Zarudiansky et al. | 62/514 R |

OTHER PUBLICATIONS

Page 2 of Advertisement Brochure from Cerro Sales Corporation.

Primary Examiner—Janice A. Howell
Assistant Examiner—Constantine Hannaher
Attorney, Agent, or Firm—Patrick H. McCollum; Richard M. Byron

[57] ABSTRACT

A device for providing both thermal protection and radiation shielding for components within a well logging instrument. A thermally insulative flash contains a mass of eutectic material which undergoes a change of state at a temperature which will provide an acceptable thermal environment for such components for extended time periods. The eutectic material has a density facilitating its use as a radiation shield and is distributed around the component so as to selectively impede the impinging of the component by radiation.

13 Claims, 6 Drawing Figures

FIG. 1
FIG. 3
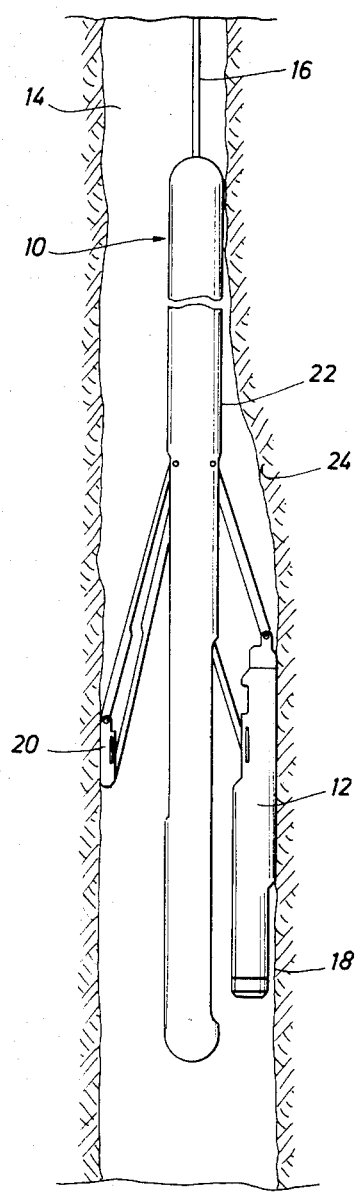
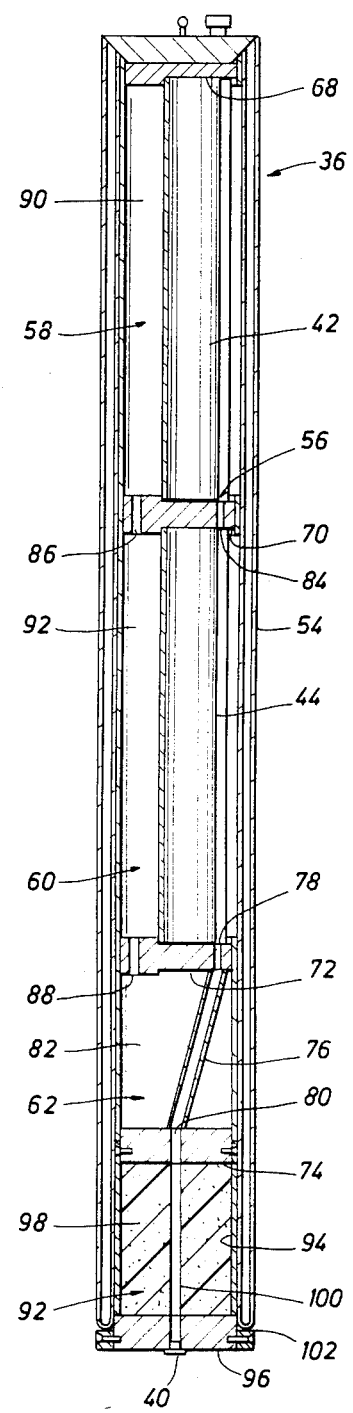

COMBINATION THERMAL AND RADIATION SHIELD

BACKGROUND OF THE INVENTION

This invention relates generally to combined thermal and radiation shielding apparatus and more specifically relates to apparatus for providing thermal and radiation shielding for components within a well logging instrument.

In the oil and gas exploration industry it is well known to determine parameters of subsurface earth formations by surveying or logging a borehole penetrating such formations by traversing the borehole with one or more of various types of logging instruments. Some species of these logging instruments use radiation-sensitive devices to determine formation parameters, such devices requiring appropriate use of radiation shielding to assure accuracy of the determined parameters. For example, in a not uncommon embodiment of a gamma-gamma density logging instrument used to determine the bulk density of the formations, the formations are irradiated with gamma radiation emitted by a source supported adjacent to the formations in a skid pad designed to generally follow the contours of the borehole sidewall. The scattering of the gamma radiation caused by the formations is determined by measuring the intensity of scattered gamma radiation at two dissimilar longitudinal distances from the radiation source by two gamma ray detectors also supported in the skid pad. Radiation shielding is provided within the skid pad around the source to generally collimate the gamma radiation emitted by the source and insure that such radiation is directed into the formations surrounding the borehole, and also is provided around the detectors to insure that they are impinged only by radiation scattered within, and coming directly from, the formations adjacent the skidpad. This radiation shielding requires the distribution of a mass of material around the source and detectors in such proportions that the thickness of the material within the path of the radiation combined with the density of the material, serve to essentially block the passage of the radiation therethrough. The intensity of the radiation measured by the detectors may then be correlated with instrument calibration data to yield an indication of the bulk density of the formations.

In conducting well logging operations it is not uncommon to encounter borehole temperatures in excess of 260° C. Therefore, it is necessary for logging instruments utilized in such high temperature environments either to consist of components capable of operating at such temperatures or to provide adequate thermal shielding to maintain an acceptable thermal environment for the components. One means to accomplish such thermal shielding is to place the components requiring thermal protection within a Dewar flask, such flask also containing a volume of a eutectic compound to serve as a heat sink. As the instrument is lowered into a borehole and the ambient temperature surrounding the instrument increases, heat will gradually leak into the Dewar flask. Once the temperature reaches the eutectic temperature of the eutectic heat sink however, the heat will be generally absorbed by the eutectic substance as it undergoes its isothermal transformation, thereby causing the temperature within the flask to remain generally stable until the majority of the heat sink material has melted. Components within the flask may therefore be maintained at a temperature substantially equivalent to the melting temperature of the eutectic compound for a given period of time dependent upon the quality of the flask and the volume of eutectic material used as a heat sink.

The size of a logging instrument is often an important design consideration therefor as it may affect the ability of the instrument to traverse the borehole in the desired manner. This is particularly true in cases such as the gamma-gamma density logging instrument discussed earlier herein, wherein components are supported within a skid pad which is preferably of as generally minimal length as is practicable so as to facilitate the ability of the skid pad to follow the borehole contours while providing sufficient spacing between source and detectors for accurate measurements. The greater the length of the skid pad, the greater the tendency for the skid pad to lose contact with the borehole sidewall as it traverses washouts or anomalies therein, thereby leading to inaccuracies in the determined formation density. Because of the spatial restrictions upon logging instruments, and because of the absolute requirement of a mass of radiation shielding for some components contained therein, some logging instruments, of necessity, have been adapted to operate with minimal or no thermal shielding for such components because the volume of thermal ballast required to provide an effective heat sink along with the necessary mass of radiation shielding would require a volume in excess of practical limits. For example, prior art methods of gamma-gamma density logging have often relied upon the use of Geiger counter tubes capable of operating at the high temperatures encountered within boreholes. Notwithstanding the operation of these tubes at borehole temperatures, the life expectancy and reliability of the Geiger counter tubes can typically be significantly increased by shielding the tubes from the hostile thermal environment of the borehole. Further, it would often be preferable to facilitate the use of scintillation counters within such logging instruments, rather then Geiger counter tubes, because of the increased sensitivity to radiation of the scintillation counters and the accompanying improved resolution of measurement achievable through use thereof. Additionally, in certain types of logging instruments it is desirable to measure only radiation of certain predetermined energy levels, such selective energy level detection being beyond the capability of conventional Geiger counter tubes. Scintillation counters, however, will typically operate satisfactorily only at temperatures significantly lower than those which are acceptable for Geiger counter tubes, generally not in excess of from 65° F. to 150° F. and preferably at the lower end of such range.

Accordingly, the present invention overcomes the deficiencies of the prior art by providing an apparatus for shielding components within a well logging instrument while also maintaining a suitable, generally stable, thermal environment for a period of time for such components.

SUMMARY OF THE INVENTION

Apparatus according to the present invention includes a canister or container forming a chamber which contains a mass of material having a capability to serve as a thermal ballast, ie, a material which undergoes a change of state, such as melting, at a temperature which is suitable as a thermal environment for the components to be contained therein, and having a sufficiently high heat of fusion to stabilize at such transformation temperature for a practical period of time. Such material additionally has a sufficient density that it may be distributed around components within the practical spatial limitations of a well logging instrument in such a manner as to limit the radiation impinging the components to a desired collimated plane or planes. A thermally insulative flask, preferably a Dewar flask, contains such canister and such components, either as a part of such flask or as an independent member, so as to provide an initial insulative barrier between the component and the ambient temperature.

BRIEF DESCRIPTION OF THE DRAWINGS

FIG. 1 illustrates a borehole penetrating an earth formation, shown in vertical section, in which is disposed a logging instrument of a type making beneficial use of a combination thermal and radiation shield in accordance with the present invention.

FIG. 3 illustrates in side view and partially in cross-section the detector module of a combination thermal and radiation shield in accordance with the present invention.

DETAILED DESCRIPTION OF THE PREFERRED EMBODIMENT

Figure 2A:
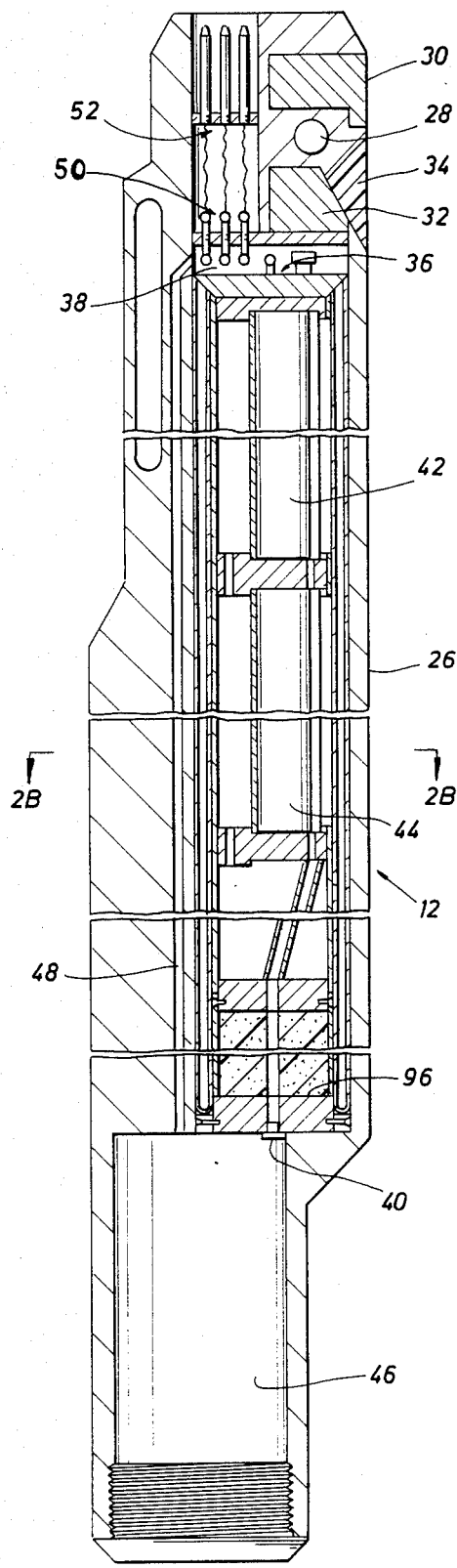
FIG. 2A illustrates, in side view and partially in cross-section, the skid pad of the logging instrument of FIG. 1.

Referring now to the drawings in more detail, particularly to FIG. 1, therein is illustrated a logging instrument 10, such as one suitable for use in gamma-gamma density logging, including a skid pad 12 in which may be housed a combination thermal and radiation shield in accordance with the present invention. Although a density logging instrument is illustrated and will be discussed herein, it will be readily appreciated that the combination thermal and radiation shield may readily be adapted for use in other logging instruments and may be particularly useful in logging instrments wherein thermal protection as well as shielding from radiation is necessary. Instrument 10 is suspended by cable 16 within a borehole 14 penetrating earth formations 24. Cable 16 will contain electrical conductors (not illustrated) suitable for communicating electrical signals between instrument 10 and electronic circuitry (not illustrated) located at the earth's surface in a manner known to the art. In a typical logging operation, instrument 10 is caused to traverse borehole 14 by spooling or unspooling cable 16 from a drum (not illustrated) at the earth's surface, also in a manner known to the art. As instrument 10 is caused to traverse borehole 14, skid pad 12 is maintained in generally constant contact with sidewall 18 of borehole 14 by a biasing mechanism within instrument 10 which forces both pressure pad 20 and skid pad 12 away from body member 22 of instrument 10 and against sidewall 18 of borehole 14.

Figure 2B:
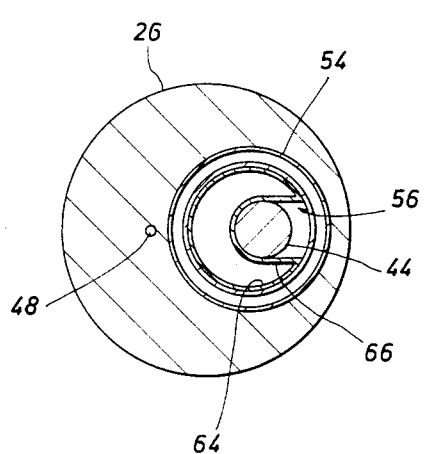
FIG. 2B illustrates in lateral cross-section the skid pad of the logging instrument of FIG. 1.

Referring now to FIGS. 2 A-B of the drawings, therein is shown skid pad 12 of instrumet 10 of FIG. 1, illustrated in FIG. 2A in side view and partially in cross-section, and illustrated in FIG. 2B in lateral cross-section. Skid pad 12 includes a housing 26 which is of suitable material and construction to withstand the temperatures and pressures of the borehole environment. Skid pad 12 is also preferably of a conformity to facilitate movement along the sidewall of a borehole. Housed proximate one end of skid pad 12 is a source of gamma radiation 28, for example, a chemical cesium-137 source emitting gamma rays with an energy of 0.667 Mev. Affixed to housing 26 and generally surrounding source 28 are blocks 30 and 32 which are constructed of suitable material, preferably tungsten, and of such shape, as to collimate the radiation emitted by source 28 through window 34 and into the formation adjacent skid pad 12 when instrument 10 is disposed within a borehole. Window 34 consists either of a void or of a material providing a minimum of attenuation of the gamma radiation emitted by source 28.

Located within a generally cylindrical cavity 38 in housing 26 is shield module 36 which will be discussed in more detail later herein. Coupled to bulkhead 96 at the base of shield module 36 is an electrical connector 40 facilitating electrical communication between electronics section 46 and radiation detectors 42 and 44 supported within shield module 36. Electronics section 46 contains such electronic circuitry as necessary to provide power for the operation of detectors 42 and 44 and to process the electrical signals therefrom prior to communication of the signals to the earth's surface, such processing accomplished in a manner familiar to the art. Electrical conductors (not illustrated) traverse a passage 48 in body member 26 to reach terminals 50, which are suitably coupled to terminals 52 which are adapted to withstand the temperatures and pressures of the borehole environment and to communicate signals from electronics section 46 to electronic circuitry (not illustrated) within the body member (22 in FIG. 1) of the instrument (10 in FIG. 1).

Figures 4A, 4B:
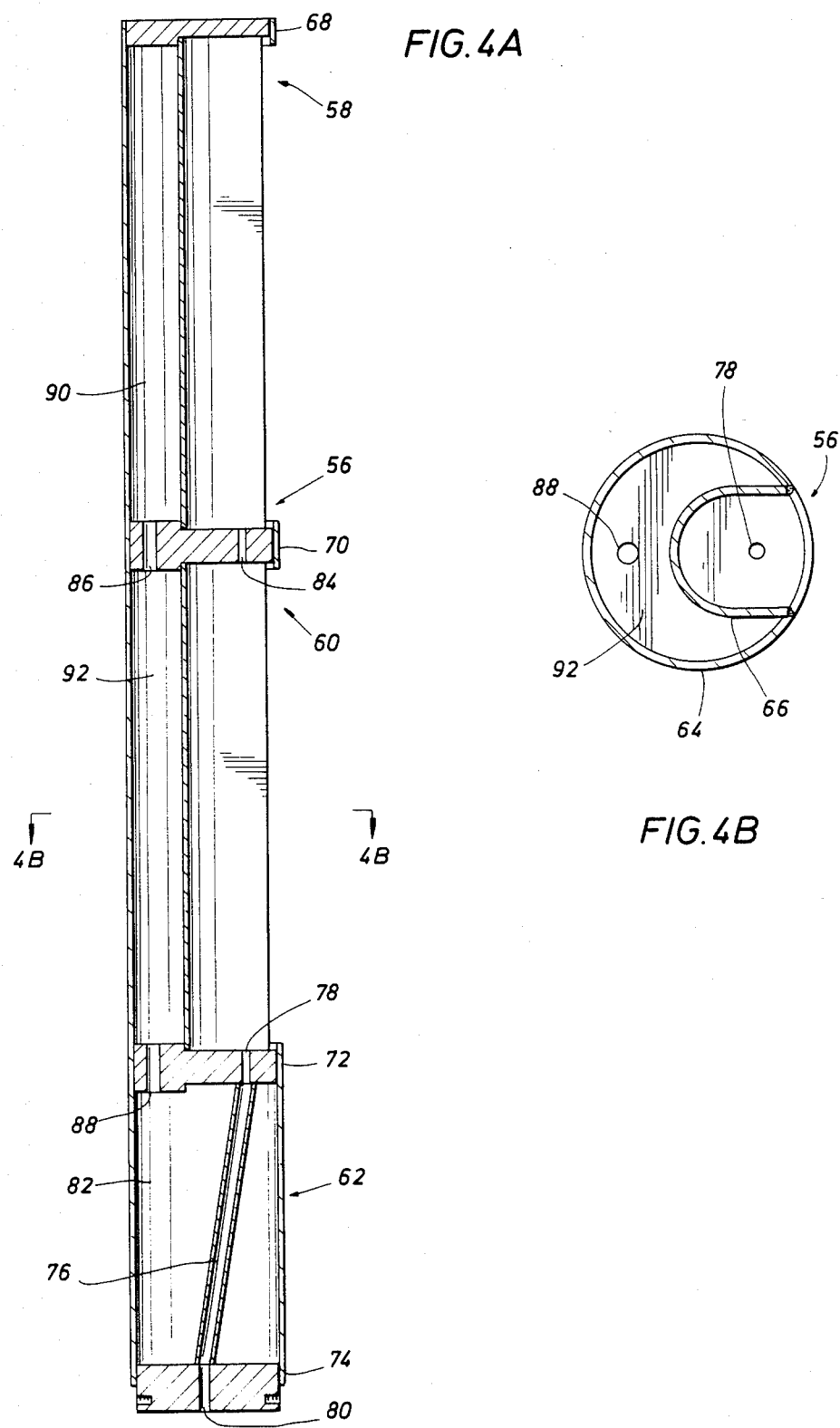
FIG. 4A illustrates in side view and in cross-section the canister weldment of the detector module of FIG. 3.
FIG. 4B illustrates in lateral cross-section the canister weldment of the shield module of FIG. 3.

Referring now to FIG. 3 of the drawings, therein is shown shield module 36 of skid pad 12 of FIG. 2A, illustrated in side view and partially in cross-section. Shield module 36 includes a Dewar flask 54 which supports the remaining components of shield module 36. Dewar flask 54 is of conventional design, having dual spaced-apart walls, evacuated therebetween, forming a generally cylindrical shape. Held within flask 54 is canister weldment 56 which is conformed to support first and second detectors 42 and 44 generally within a body of relatively dense eutectic heat sink compound. In a preferred embodiment, canister weldment 56 (shown in greater detail in FIGS. 4A-B) includes three sections 58, 60 and 62 enclosed and separated by bulkheads 68, 70, 72 and 74. Sections 58 and 60, viewed in lateral cross-section, exhibits a convexo-concave profile, each section 58 and 60 having a generally C-shaped outer wall 64 and a generally U-shaped inner wall 66 sealingly joined at the ends of such cross-sectional shapes to form a generally cylindrical chamber having a longitudinal recess therein suitable for housing a detector within the diametrical confines of weldment 56. Referring now to FIGS. 3 and 4A, section 62 includes a chamber 82 formed by an outer wall of generally cylindrical form and contains a tube 76 sealingly engaged with aperture 78 in bulkhead 72 and aperture 80 in bulkhead 74 to provide a passage for electrical conductors (not illustrated), such passage isolated from chamber 82. An aperture 84 in bulkhead 70 facilitates the passage of electrical conductors (not illustrated) from first detector 42 through tube 76 to the exterior of canister weldment 56. Aperture 86 in bulkhead 70 and aperture 88 in bulkhead 72 allow fluid communication between chambers 82, 90 and 92 in canister weldment 56.

To provide the necessary heat sink and radiation shielding for first and second detectors 42 and 44 within flask 54, chambers 82, 90 and 92 of canister weldment 56 are filled with an appropriate eutectic compound having a relatively high heat of fusion, a relatively high specific gravity and a melting point not in excess of the temperature at which the chosen embodiments of radiation detectors 42 and 44 are desired to be maintained. One such suitable eutectic compound is an alloy consisting essentially of approximately 58% bismuth and 42% tin. Such an alloy has a latent heat of fusion of approximately 96.5 calories per cubic centimeter, a specific gravity of approximately 8.7 and a eutectic temperature of approximately 138° C. As discussed earlier herein, as heat from the borehole leaking into the flask reaches the eutectic temperature, the eutectic compound will begin to undergo its isothermal transformation, absorbing heat in the process and stabilizing temperature within the flask proximate such eutectic temperature until most of the alloy has melted. It will be appreciated that chamber 82 of canister weldment 56 is placed closest to the open end of flask 54 so as to provide a maximum of heat sinking proximate the most likely location of heat intrusion into flask 54.

Different embodiments of detectors may require differing amounts of radiation shielding. Because of the somewhat lower density of the described alloy, having a specific gravity of approximately 8.7, as compared to other materials often used for radiation shielding, such as lead, having a specific gravity of 11.34, it is preferable to design canister weldment 56 such that a greater mass of the alloy may be distributed around the detectors than if lead were being used for radiation shielding. A usage of a 1.30 centimeters thickness of alloy where one centimeter of lead would have previously been used will provide generally equivalent shielding from radiation. It will be appreciated that the placement of the detectors within recesses in canister weldment 56, such as in the illustrated preferred embodiment, not only provides maximal heat sink volume around the detectors but also serves to collimate the radiation impinging the detectors such that the detector response in a borehole will be principally due to scattered radiation from the formations surrounding the borehole.

Some components, such as many scintillation counters will be unable to operate reliably near the 138° C. temperature maintained with the above-described alloy. In such cases, a second eutectic alloy such as one consisting essentially of approximately 50% bismuth, 26.7% lead, 13.3% tin, and 10% cadmium may be an appropriate choice as the heat sink medium. Such an alloy has a melting point of 70° C. and should provide a temperature environment in which selected scintillation counters may operate. This second alloy has a latent heat of fusion of approximately 73 calories per cubic centimeter, and a specific gravity of 9.2. Because of the higher density of the second alloy, only 1.20 centimeters thereof will provide comparable shielding to one centimeter of lead. Because of the lower melting point and the lower latent heat of fusion, however, as compared to the first discussed alloy, it is necessary to utilize approximately twice the volume of the second alloy as total heat sink volume within the flask to achieve a comparable time period of temperature stabilization as can be achieved through use of the first alloy. It will be understood that additional eutectic alloys may be utilized in accordance with the present invention, the essential requirements of such alloys being a melting point proximate the temperatures desired to be maintained within the flask, a sufficiently high heat of fusion to provide practical duration of effective temperature stabilization, preferably a latent heat of fusion in excess of seventy calories per cubic centimeter and a density which will provide effective radiation shielding within a limited volume, as may typically be achieved through materials having a specific gravity preferably in excess of 8.5.

Coupled to the end of canister 56 at which chamber 82 is located is a thermal isolator 92 preferably including a tube 94 constructed of a material offering poor heat conductivity, such as fiberglass, serving as an thermally insulative spacer, generally filled with a foam material 98 offering similar heat insulation, preferably a silicon foam elastomer, such as Q7-4290 manufactured by Dow Corning Corporation, so as to provide a thermally insulative medium between the open end of flask 54 and canister 56. An aperture 100 is maintained within foam 98 to provide a passage for the electrical conductors (not illustrated) connecting first and second detectors 42 and 44 with electrical connector 40 affixed to end cap 96. End cap 96 is suitably affixed to flask 54, such as by suitable coupling with a ring 102 adhesively affixed to flask 54, to seal detector module 36 into a unit offering a maximum of thermal and radiation shielding for components contained therein.

Many modifications and variations besides those specifically mentioned may be made in the techniques and structures described herein and depicted in the drawings without departing substantially from the concept of the present invention. For example, the radiation source could be included within the flask and surrounded with the eutectic material to provide a greater eutectic heat sink mass inside the flask. Further, it is evident that semi-conductor radiation detectors or other components may also benefit from the described heat sinking and radiation shielding and collimation described herein. Additionally, the electronics section of the logging instrument may be included within the flask. Accordingly, it should be clearly understood that the forms of the invention described and illustrated herein are exemplary only and are not intended as limitations on the scope of the present invention.

The embodiments of the invention in which an exclusive property or privilege is claimed are defined as follows:

1. Apparatus for well logging including an elongated body member containing at least one component therein, and further including thermal protection and radiation shielding for said component, said thermal protection and radiation shielding comprising:
   a volume of eutectic compound contained within said body member,
   said eutectic compound having a predetermined eutectic temperature characteristic and a predetermined density,
   said volume being sufficient to provide a duration of effective temperature stabilization for said component,
   at least a portion of said eutectic compound distributed substantially around said component in effective proportions to selectively impede the impinging of said component by radiation.

2. The apparatus of claim 1, further comprising a canister, said eutectic compound contained within said canister.

3. The apparatus of claim 1, further comprising a thermally insulative flask, said component and said eutectic compound contained within said flask.

4. The apparatus of claim 3, wherein said flask comprises a Dewar flask.

5. The apparatus of claim 1, wherein said component comprises at least one gamma radiation detector.

6. The apparatus of claim 5, wherein said gamma radiation detector comprises a Geiger counter tube.

7. The apparatus of claim 5, wherein said gamma radiation detector comprises a scintillation counter.

8. The apparatus of claim 1, wherein said eutectic compound has a latent heat of fusion greater than approximately seventy calories per cubic centimeter and a specific gravity greater than approximately 8.5.

9. The apparatus of claim 1, wherein said eutectic compound comprises bismuth and lead.

10. The apparatus of claim 1, wherein said eutectic compound comprises bismuth, lead, tin and cadmium.

11. An apparatus for providing thermal protection and radiation shielding for a component within a well logging instrument, comprising:

a thermally insulative flask housed within a portion of said logging instrument;

a canister within said flask, said canister having at least one chamber contained therein;

means for supporting said component adjacent to said canister; and a volume of eutectic compound within said chamber, said compound having a predetermined thermal characteristic, said compound having a eutectic temperature suitable as a thermal environment for said component, said volume being sufficient to provide a duration of effective temperature stabilization for said component at least a portion of said compound distributed around said component in effective proportions to selectively impede the impinging of said component by radiation.

12. The apparatus of claim 11, wherein said eutectic compound has a latent heat of fusion greater than approximately 70 calories per cubic centimeter and a specific gravity greater than approximately 8.5.

13. The apparatus of claim 12, wherein said eutectic compound comprises bismuth and lead.

* * * * *